Feb. 25, 1969

K. V. B. LUNDVIK 3,429,502

OIL REGULATING MEANS FOR COMPRESSORS

Filed Sept. 29, 1967

Karl Vilhelm Bertil Lundvik
By Eric G. Munson
Attorney

United States Patent Office 3,429,502
Patented Feb. 25, 1969

3,429,502
OIL REGULATING MEANS FOR COMPRESSORS
Karl Vilhelm Bertil Lundvik, Norrkoping, Sweden, assignor to Stal Refrigeration Aktiebolag, Norrkoping, Sweden, a corporation of Sweden
Filed Sept. 29, 1967, Ser. No. 671,759
Claims priority, application Sweden, Oct. 12, 1966, 13,780/66
U.S. Cl. 230—206     1 Claim
Int. Cl. F04b *39/02;* F01m *1/10*

ABSTRACT OF THE DISCLOSURE

A liquid regulating means such as can be used for regulating oil from an oil container that contains oil separated from compressed gas. The arrangement comprises oil-distributing means leading from the oil container to lubricating points in a compressor and it also includes a slide movable in a valve casing and acted upon by the total oil pressure and also acted upon by the pressure of a spring and pressure equal to the pressure in the oil container. The valve casing has outlets through which oil can be injected to the compressor and by which oil can be returned to the container, and said openings will be closed by the slide when the pressure of the oil is low so that a flow of oil to the lubricating points will be insured. When a rise in the pressure occurs, the openings will be opened to allow oil to be injected to the compressor and to allow the oil to return to the container.

---

The present invention consists in a means for use in connection with compressors and which regulates oil from a container separated from compressed gas and wherein the oil is forced by a pump toward regulating means and by way of distributing means which have oil lines leading to lubricating points in a compressor. The regulator includes a slide acted upon by the total pressure to move it in one direction and also acted upon by a spring and a pressure equal to that in the oil container. When the pressure of the oil is below a certain value, the flow of oil to the lubricating points will be insured, and upon a rise in pressure the oil will be first injected to the compressor and will also be allowed to return to the oil container.

The present invention provides for a distribution of the oil in such a manner that in the event of a deficiency in oil the most important requirements will be given priority and will be first met. An oil deficiency may be caused by a number of factors, such as for example, insufficient oil in the oil container or a worn pump or a blocked filter. Bearing lubrication has been considered the most important since dry, unlubricated bearings will quickly cause the compressor to break down. Injection of oil in the compressor is important for efficiency and to prevent the temperature of the gas after compression from becoming too high. In order to prevent an undesirable high pressure when too much oil is supplied, a passage is opened so that the oil returns to the oil reservoir.

With these and other objects to be hereinafter set forth in view, I have devised the arrangement of parts to be described and more particularly pointed out in the claim appended hereto.

Figure 1:
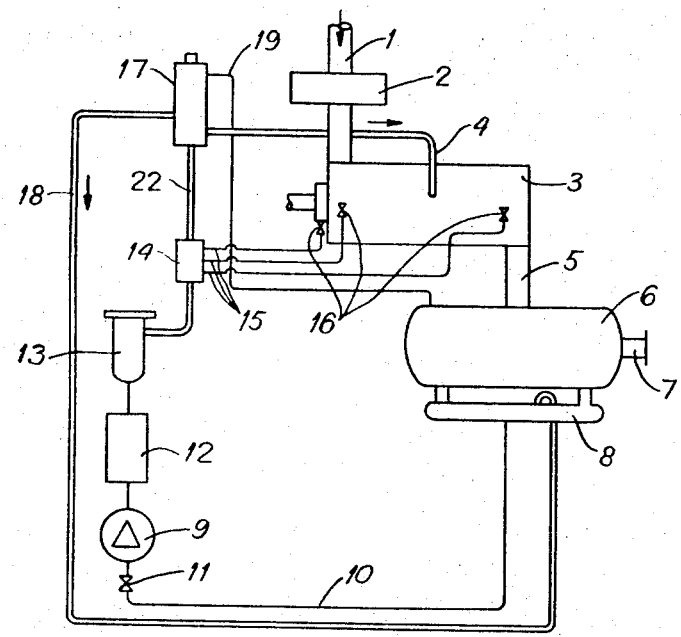
Figure 2:
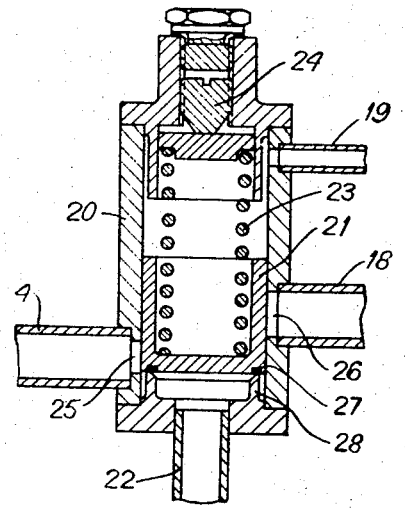

In the accompanying drawing, wherein an illustrative embodiment of the invention is disclosed, FIG. 1 diagrammatically shows the improved system and FIG. 2 shows the regulator in longitudinal section.

Referring to FIG. 1, gas is sucked through a conduit 1 and passes through a dirt trap 2 to a compressor 3, in which a rise in pressure takes place. During periods of compression, oil is injected into the gas through a pipe 4. The compressed, oil-rich gas leaves the compressor through a conduit 5 and is forced into an oil separator 6, where the oil is separated from the gas. The oil-free gas is led away through a conduit 7, for example to a condenser in a cooling system, while the oil is collected in a container 8.

An oil pump 9 sucks the oil from the container 8 through a conduit 10, provided with a cut-off valve 11, and forces it through an oil cooler 12 and through an oil filter 13, from which the clean oil enters an oil distributor means 14 having discharge lines 15, which carry the oil to different lubricating points in the compressor. The oil lines 15 are provided with servicing valves 16 which, during normal operation of the system, remain open. The oil flows from the distributing means to a regulator 17 which is provided with outlets, intended for the injection of oil in the compressor through the pipe 4 and allows oil to flow back to the container 8 through a pipe 18. The pressure in the oil separator 6 is used as a control pressure for the oil regulator 17 and is transmitted through a pipe 19.

As is seen in FIG. 2, the regulator is provided with a slide or piston 21 which is capable of movement in a valve housing 20. Oil enters from the distributing means through a pipe 22 and exerts pressure against the bottom face of the slide 21. The opposite end of the slide is actuated by a spring 23, the tension of which can be adjusted by a screw 24, and the pressure transmitted from the oil separator through the pipe 19.

Acting on the bottom face of the slide 21 is a total pressure equal to the sum of the pressure in the container 8 and the pump pressure. When the slide is moved upward first an opening 25 to the pipe 4 is uncovered for oil injection. Further movement of the slide upwardly, exposes another opening 26 to the pipe 18 so that oil can be caused to flow back to the container 8.

If for any reason there is an oil deficiency, the regulator will be closed and oil will be passed through the lines 15, only to the lubricating points. If the oil supply is normal, the regulator will be opened and oil passed for injection into the compressor. The pressure of the oil is, for this purpose, determined by the adjustable spring 23.

If the pressure of the oil is too high, such as the oil being too cold, the slide will move further upwardly and will open to allow oil to flow back to the container 8. Thus, a too high pressure will be prevented in the system.

The regulator also performs another function. When the compressor and oil pump stop, the different pressures in the system attempt to reach equilibrium. The gas from the oil separator flows back through the compressor, to the suction side. In the event of a stoppage it is important that only gas flows back through the compressor and that no oil is led away from the container 8 through the injection pipe 4. This is insured by the design of the slide. As soon as the oil is no longer under pressure the slide will move downwardly until it blocks the flow of oil through the opening 25. The compressor is in this way prevented from "spitting" oil back into the suction conduit.

The regulator also has another function. Rolled into the bottom face of the slide is a sealing ring 27 which in closed position seals against a seat 28 in the inlet flange. This enables the oil system to be serviced easily for the replacement of filter inserts, repairs to the oil pump etc. It is only necessary to close the cut-off valve 11 on the suction side of the oil pump and the service valves 16 in the oil lines 15, and the filter 13 for example, can then be opened. The inner pressure in the system forcing the slide 21 against the seat and a preferably good seal is obtained.

Having thus described an embodiment of the invention, it is obvious that the same is not to be restricted thereto, but is broad enough to cover all structures coming within the scope of the annexed claim.

What I claim is:

1. An oil regulating system for a compressor, for regulating oil from a container that contains oil separated from a compressed gas, a regulator toward which oil is forced, a pump for forcing the oil toward the regulator, an oil distributing means through which the oil is forced, said oil-distributing means leading to lubricating points in a compressor, the regulator including a slide valve contained in a valve casing in which it is movable, one end of the slide being acted upon by the total oil pressure, a spring for action on the other end of the slide together with a pressure equal to that in the oil container, the valve casing being provided with a plurality of openings through which oil can be injected to the compressor and by which oil can be returned to the oil container, said openings being closed when the pressure of the oil to the lubricating points is assured, so that upon a rise in pressure the openings are opened in a manner to first allow oil to be injected in the compressor, and then to allow the oil to return to the oil container.

References Cited

UNITED STATES PATENTS

| | | | |
|---|---|---|---|
| 2,072,180 | 3/1937 | Paton | 184—6 |
| 2,471,868 | 5/1949 | Fites | 230—206 |
| 3,070,288 | 12/1962 | Richards | 230—206 |

ROBERT M. WALKER, *Primary Examiner.*

U.S. Cl. X.R.

184—6